United States Patent [19]

Takano et al.

[11] Patent Number: 4,555,241

[45] Date of Patent: Nov. 26, 1985

[54] REINFORCED DRIVE BELT STRUCTURE

[75] Inventors: Hiroshi Takano, Miki; Kunikatsu Shiinoki, Kobe, both of Japan

[73] Assignee: Mitsuboshi Belting, Ltd., Kobe, Japan

[21] Appl. No.: 451,045

[22] Filed: Dec. 20, 1982

[51] Int. Cl.[4] .............................................. F16G 1/00
[52] U.S. Cl. .................................. 474/261; 474/205; 474/265
[58] Field of Search .............. 474/265, 268, 250, 204, 474/205, 260, 261, 262

[56] References Cited

U.S. PATENT DOCUMENTS

| | | | |
|---|---|---|---|
| 3,297,514 | 1/1967 | Poeschl et al. | 474/268 X |
| 3,485,707 | 12/1969 | Spicer | 474/261 X |
| 3,835,720 | 9/1974 | Fisher et al. | 474/250 |
| 3,968,703 | 7/1976 | Bellmann | 474/250 |
| 4,083,261 | 4/1978 | Speer et al. | 474/268 X |
| 4,305,714 | 12/1981 | Renshaw | 474/250 |

*Primary Examiner*—James A. Leppink
*Assistant Examiner*—Frank McKenzie
*Attorney, Agent, or Firm*—Wood, Dalton, Phillips, Mason & Rowe

[57] ABSTRACT

A V-belt 10, 110, 210, 310, 410, 510, 610, 710, and 810 having a rubber body 111, 211, 311, 411, 511, 611, 711 and 811 defining an upper surface 12, 112, 212, 312, 412, 512, 612, 712 and 812 and a lower surface 13, 113, 213, 313, 413, 513, 613, 713 and 813 and a plurality of substantially parallel low elongation high-strength tensile cords 14, 114, 214, 314, 414, 514, 614, 714 and 814 extending lengthwise longitudinally of the V-belt intermediate the upper and lower faces. A plurality of filament reinforcing elements 16, 17, 116, 117, 216, 316, 416, 516, 616, 716, 816, 217, 317, 417, 517, 617, 717 and 817, 224, 428 are provided for resisting transverse expansion of the V-belt during high power drive operation. The transverse filament reinforcing elements selectively define monofilament elements and bundled filament elements as desired. Different arrangements of the reinforcing elements in the belt body are disclosed. Different belt structures including plane type raw edge belt structures and cog type belt structures are disclosed utilizing the transverse filament reinforcing elements.

19 Claims, 9 Drawing Figures

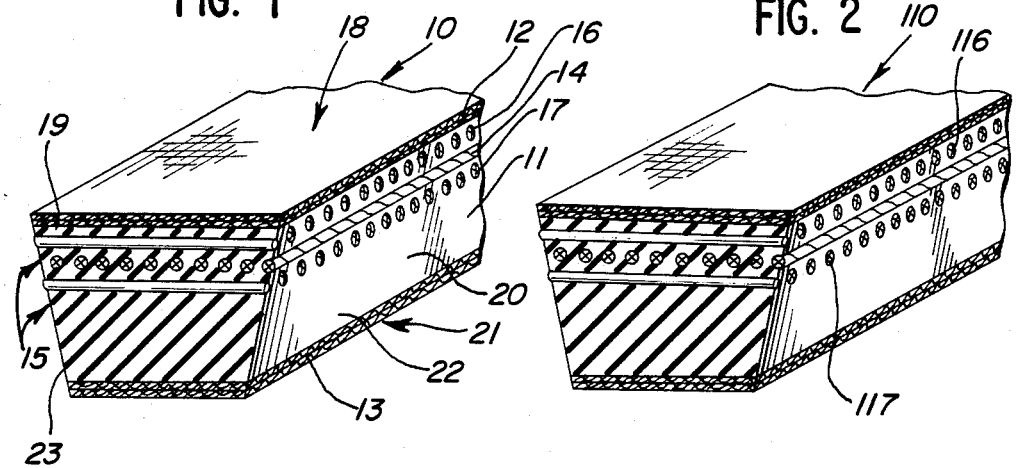
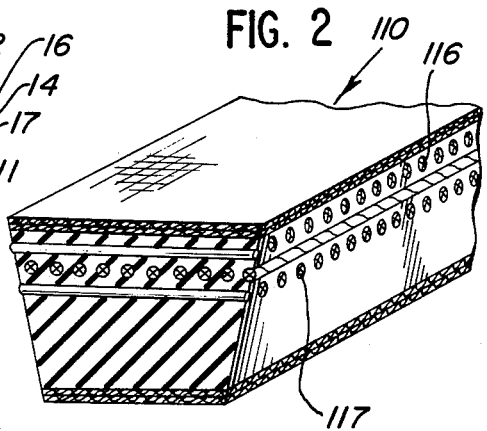
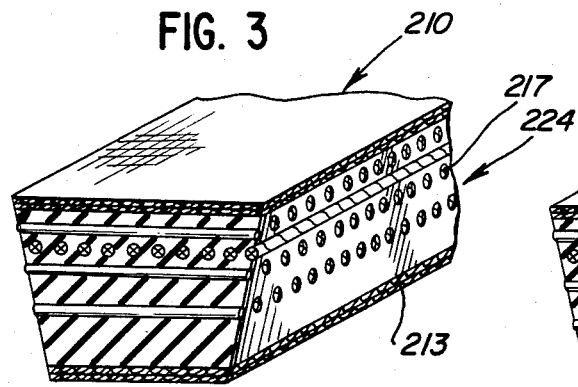
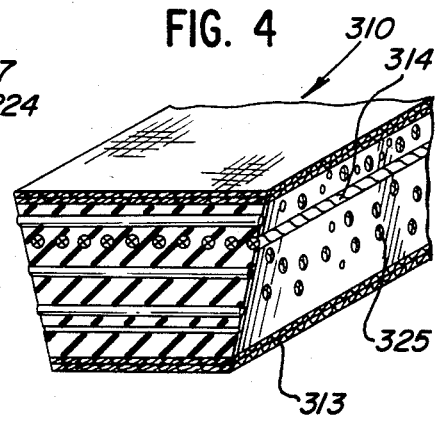

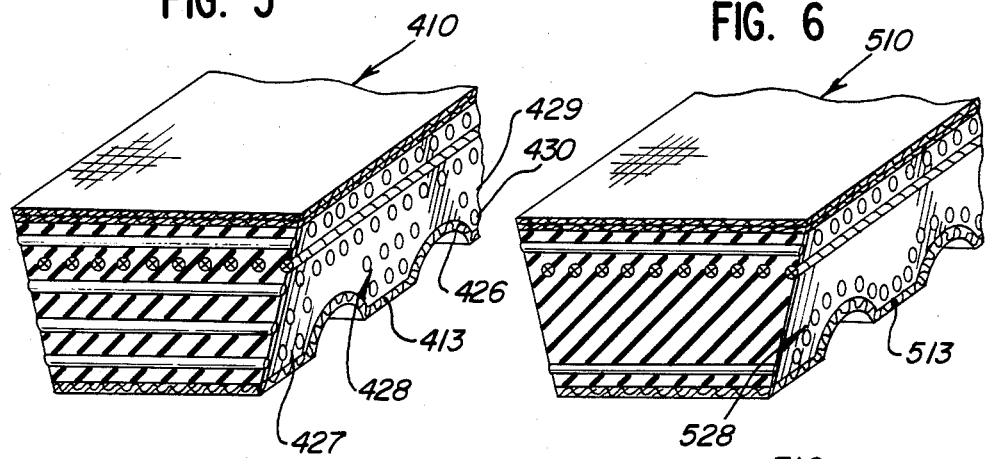
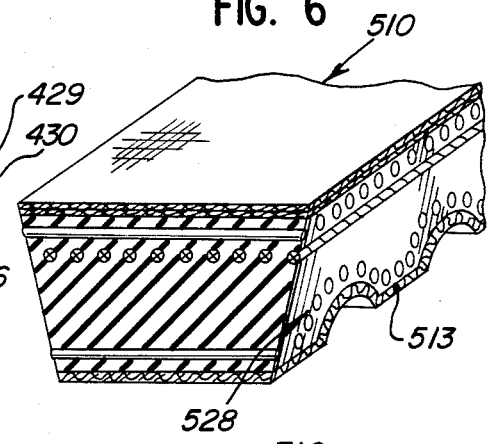
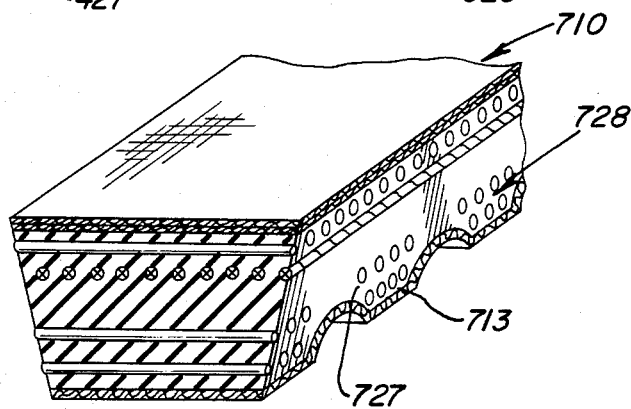
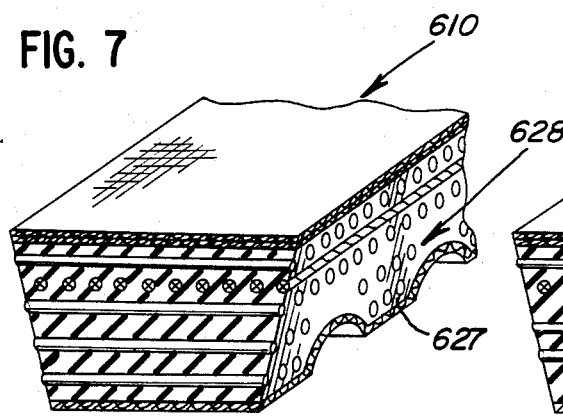
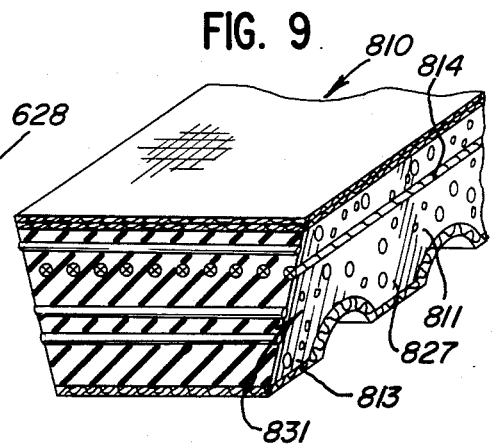

REINFORCED DRIVE BELT STRUCTURE

TECHNICAL FIELD

This invention relates to V-belt structures and in particular to V-belt structures for use in power transmission.

BACKGROUND ART

In one conventional form of V-belt structure the V-belt is defined by a body of rubber having a trapezoidal cross-section. A plurality of low elongation, high strength tensile cords are provided in parallel transversely spaced relationship to extend longitudinally through the body intermediate the upper and lower faces of the body. The lower portion of the body defines a compression section and the upper portion of the body defines a tension section.

It is further conventional to provide such V-belts with reinforcing fabric on one or both of the upper and lower faces. Such fabrics may be provided in one or more layers on the respective faces.

In one conventional form of such a V-belt known as a raw edge-type V-belt, the side faces of the V-belt are uncovered.

As the belt body is formed of a flexible rubber material, the belt provides desirable bending strength.

However, when the belt is entrained about a pulley in the drive system, lateral pressure causes the belt to expand laterally against the pulley surfaces tending to increase friction and noise. In an effort to stiffen the belt against this lateral expansion, it has been common to provide in the belt short staple fibers such as Stiflex fibers which are arranged to extend in the transverse direction to provide enhanced lateral stability and resistance to expansion.

However, it has been found that the use of such Stiflex material has not provided sufficient resistance to transverse expansion, particularly where the belt is used in high power transmission systems. Illustratively, such belts have been found to be unsatisfactory for use as power transmission belts in torque converters such as used in motorcycles, farm appliances, etc.

DISCLOSURE OF INVENTION

The present invention is directed to overcoming one or more of the problems as set forth above.

The present invention comprehends an improved V-belt structure having high resistance to lateral expansion of the V-belt notwithstanding the use thereof in drive systems having high power transmission characteristics.

The present invention comprehends a provision of such a V-belt wherein a plurality of filament reinforcing elements, each extending substantially fully transversely across the body, are provided in both the upper and lower portions thereof.

In one embodiment of the present invention, the reinforcing elements comprise monofilaments and in another embodiment the reinforcing elements comprise a bundle of filaments.

In the illustrated embodiments, the reinforcing elements are formed of a synthetic resin.

Where the reinforcing elements comprise monofilaments, they may be formed of a synthetic resin selected from the group comprising polyester resin, polyamyde resin, and polycarbonate resin.

Where the reinforcing elements comprise a bundle of fibers, they may be formed of a synthetic resin material selected from the group comprising polyester resin, aliphatic polyamide resin, aromatic polyamide resin, polyvinyl alcohol resin, and polyvinyl acetate resin.

In certain of the embodiments the transverse filament reinforcing elements are disposed adjacent the tensile cords only. In other embodiments additional transverse filament reinforcing elements are disposed adjacent the lower face.

In another embodiment the transverse filament reinforcing elements are disposed intermediate the tensile cords and the upper face and a second group of filament reinforcing elements is disposed adjacent the lower face.

In another embodiment the filament reinforcing elements are distributed randomly. In one such random distribution embodiment the transverse filament reinforcing elements are spaced from the inner face and in another form the transverse filament reinforcing elements are distributed randomly through all portions of the body.

Thus the invention broadly comprehends the provision of a plurality of transverse filament reinforcing elements at least a portion of which are disposed adjacent the tensile cords of the V-belt. Various arrangements of the transverse filament reinforcing elements are comprehended within the scope of the invention.

The V-belt structure embodying the invention is extremely simple and economical of construction which yet providing a highly improved, long trouble-free life notwithstanding the use of the V-belt in high power transmission systems.

BRIEF DESCRIPTION OF THE DRAWINGS

FIG. 1 is a fragmentary perspective section of a V-belt embodying the invention;

FIG. 2 is a fragmentary perspective section illustrating another form of V-belt embodying the invention;

FIG. 3 is a fragmentary perspective section illustrating still another form of V-belt embodying the invention;

FIG. 4 is a fragmentary perspective section illustrating yet another form of V-belt embodying the invention;

FIG. 5 is a fragmentary perspective section illustrating a further form of V-belt embodying the invention;

FIG. 6 is a fragmentary perspective section illustrating still another form of V-belt embodying the invention;

FIG. 7 is a fragmentary perspective section illustrating yet another form of V-belt embodying the invention;

FIG. 8 is a fragmentary perspective section illustrating another form of V-belt embodying the invention; and FIG. 9 is a fragmentary perspective section illustrating a further form of V-belt embodying the invention.

BEST MODE FOR CARRYING OUT THE INVENTION

The invention comprehends the provision in a V-belt generally designated 10 having a rubber body 11 defining an upper surface, or face, 12 and a lower surface, or face, 13, and a plurality of substantially parallel, low elongation, high strength tensile cords 14 extending lengthwise longitudinally of the V-belt intermediate the faces 12 and 13, of improved means for preventing undesirable transverse expansion of the belt in use.

More specifically, the transverse expansion prevention means generally designated 15 includes a first plurality of filament reinforcing elements 16, each extending substantially fully transversely across body 11 outwardly adjacent the tensile cords 14. In the embodiment of FIG. 1, the transverse expansion prevention means 15 further includes a second plurality of filament reinforcing elements 17, each extending substantially fully transversely across the body 11 inwardly adjacent the tensile cords 14.

In the embodiment of FIG. 1, V-belt body 11 is preferably formed of rubber such as natural rubber, styrene-butadiene rubber, chloroprene rubber, or acryl-nitrile butadiene rubber. The rubber may be formed of a blend of one or more such rubbers as desired.

As further shown in FIG. 1, upper surface 12 is provided with reinforcing fabric generally designated 18 which may comprise a bias fabric, or a wide-angle fabric composed of cotton warp and woof threads. The fabric may be provided as a single layer or multiple layers as desired.

Tensile cords 14 illustratively may be formed of suitable synthetic resin fibers such as polyester resin, aliphatic polyamide resin, or aromatic polyamide resin such as that provided under the trademark Kevlar. Alternatively, the tensile cords may be formed of glass fibers. As shown, the tensile cords are embedded in parallel between the upper portion 19 of body 11 conventionally referred to as the tension section, and the lower portion 20 of the body conventionally referred to as the compression section.

As further shown in FIG. 1, lower face 13 may be provided with a reinforcing fabric 21. Illustratively, the fabric 21 may be similar to the upper fabric 18 as discussed above. Alternatively, lower fabric 21 comprises a fabric woven with woolly processed, crimped nylon woof and normal nylon woof threads.

Fabrics 18 and 21 may be secured to the upper face 12 and lower face 13 respectively by suitable adhesive means.

In the embodiment of FIG. 1, the transverse filament reinforcing elements 16 and 17 comprise monofilaments formed of a suitable synthetic resin. Illustratively, the monofilaments may be formed of polyester resin, polyamide resin, polycarbonate resin, etc. In the illustrated embodiment the transverse monofilaments have a cross-sectional diameter in the range of approximately 0.2–2 millimeters.

Illustratively, the monofilaments may be provided with suitable adhesive material on the outer surface thereof prior to the embedment in the rubber body.

The monofilaments may be provided as shown in FIG. 1 in a layered arrangement. The invention comprehends the provision of such filaments in one or more layers as desired.

The invention comprehends that the monofilament 17 may be formed of similar material as monofilament 16 or different material as desired.

The provision of the transverse filament reinforcing elements has been found to prevent migration of the tensile cords from the desired layered arrangement illustrated in FIG. 1 which has occurred in prior art belts due to heating of the belt during operation. By maintaining the tensile cords in the desired disposition extended belt life is provided.

In the embodiment of FIG. 1, lower surface 13 is essentially planar and the side edges 22 and 23 are exposed so as to define a raw edge belt construction.

Referring now to the embodiment of FIG. 2, a V-belt structure generally designated 110 is shown to comprise a V-belt structure similar to V-belt structure 10 but wherein the transverse filament reinforcing elements 116 and 117 comprise bundles of smaller diameter filaments. Illustratively, each bundle comprises approximately 1800–2300 filaments having a diameter in the range of approximately 21–30 microns. The small diameter filaments in the illustrated embodiment are preferably formed of a synthetic resin such as polyester resin, aliphatic polyamide resin, aromatic polyamide resin, polyvinyl alcohol resin, or polyvinyl acetate resin.

The multifilament elements 116 and 117 are preferably plied to a twisting coefficient of approximately 0.3–2.5. The individual small filaments are treated with a blend of epoxy resin and isocyonate in a weight blending ratio of approximately 0.5–2.0. The small diameter filaments are immersed in the processing liquid dissolved in toluine solution in approximately 10–25% concentration and are heat treated at a temperature of approximately 170° C. to 240° C. for approximately 60–120 seconds to produce a high rigidity filament bundle having an outer diameter of approximately 1–2 mm.

To further increase the adhesiveness of the reinforcing elements to the embedding rubber, the bundles are immersed in a resorcinol, formalin, latex liquid mixture followed by treatment with a suitable adhesive such as mucilage in a subsequent drying and hardening step.

The use of such transverse filament bundle reinforcing elements provides a highly improved V-belt structure having high transverse expansion resistance with the reinforcing elements being effectively maintained bonded to the embedding rubber to provide a long, trouble-free life of the V-belt structure.

As illustrated in FIG. 3, the invention comprehends the provision of a V-belt structure generally designated as 210 which is similar to V-belt structures 10 and 110 but having a second layer of transverse filament reinforcing elements generally designated 224 intermediate the first layer of elements 217 and the lower face 213 of the belt structure. The transverse filament reinforcing element 224 may comprise monofilaments such as monofilament 17 as illustrated in FIG. 1 are bundled elements such as elements 117 as illustrated in FIG. 2, as desired.

Referring to the embodiment of FIG. 4, a modified form of V-belt structure generally designated 310 is shown to comprise a similar V-belt construction but wherein the transverse filament reinforcing elements generally designated 325 are distributed randomly upwardly of and below the tensile cords 314.

The transverse elements 325 may comprise monofilaments similar to monofilament 17 or bundled filament elements such as elements 117, as desired.

Referring now to the embodiment of FIG. 5, a further modified form of V-belt structure generally designated 410 is shown to comprise a V-belt structure generally similar to V-belt structure 10 but wherein the lower surface 413 is provided with a plurality of longitudinally spaced, transversely extending, downwardly opening grooves 426 cooperatively defining a plurality of cogs 427.

As further illustrated in FIG. 5, a third plurality 428 of transverse filament reinforcing elements is provided in belt structure 410 substantially in the cogs 427 to provide further enhanced transverse stability and resistance to expansion. As shown in FIG. 5, transverse reinforcing elements 428 may be provided in a plurality of layers such as layers 429 and 430.

The transverse reinforcing elements 428 may comprise monofilaments similar to monofilament 17 of V-belt structure 10.

Referring to the embodiment of FIG. 6, still another modified form of V-belt structure generally designated 510 is shown to comprise a cog-type V-belt structure similar to that of V-belt structure 410 of FIG. 5 but wherein the transverse filament reinforcing elements 528 are arranged in a layer generally conforming to the configuration of the lower belt face 513 and closely adjacent thereto. The reinforcing elements 528 may comprise monofilaments or filament bundle elements as discussed above as desired.

Referring to FIG. 7, still another form of V-belt structure generally designated 610 is shown to comprise a V-belt structure generally similar to that of V-belt structure 410 but wherein the filaments 628 disposed in the respective cog portions 627 are formed of filament bundles similar to the filament bundles 116 and 117 of V-belt structure 110.

Referring to the embodiment of FIG. 8, still another form of V-belt structure generally designated 710 embodying the invention is shown to comprise a V-belt structure generally designated 710 similar to the V-belt structures 410 and 610 discussed above but wherein no layer of transverse filament reinforcing elements is provided below the tensile cords 714. Thus the transverse filament reinforcing elements generally designated 728 adjacent the lower surface 713 in the cogs 727 may comprise monofilament reinforcing elements or filament bundle elements as discussed above as desired.

Referring now to the embodiment of FIG. 9, still another form of V-belt structure generally designated 810 is shown to comprise a V-belt structure wherein the transverse filament reinforcing elements generally designated 831 are uniformly distributed in the V-belt body 811 both above and below the tensile cords 814 and extending to adjacent the lower face 813. Reinforcing elements 831 may comprise monofilaments or filament bundle elements as discussed above as desired. Further, lower face 813 may comprise a grooved or faced as illustrated in FIG. 9 or a plane lower face such as face 313 illustrated in FIG. 4 as desired. Where the lower face 813 is grooved, the transverse filament reinforcing elements 831 include a portion thereof which may be disposed within the cogs 827 as shown.

Elements or portions of the structures of the V-belt modifications illustrated in FIGS. 2-9 which are similar to corresponding elements or portions of V-belt structure 10 are identified by similar reference numerals but 100 different. Except as otherwise noted above, the structure and functioning of the V-belts 110-810 are similar to that of V-belt structure 10 in each of the embodiments improved resistance to migration of the tensile cords through the rubber body as a result of high-powered transmission use of the belt as effectively avoided by the stabilizing and transverse expansion resistance functioning of the transverse filament reinforcing elements. In those embodiments wherein the transverse filament reinforcing elements are further provided within the cogs of the cog belt structures enhanced resistance to transverse expansion of the cogs themselves is provided and thereby further improving the trouble-free life of the V-belt.

The invention comprehends the use in a given V-belt structure of transverse filament reinforcing elements which are similar throughout the construction or which may differ both as to composition and/or physical arrangement including not only selective use of monofilament and bundled filament elements but also the use of different diameter reinforcing elements in the given belt structure. It is desirable to coordinate the desired transverse expansion resistance characteristics of the filament reinforcing elements utilized with the requirements of the belt at different portions thereof so as to provide optimum long trouble-free life of the belt while concurrently maintaining desired flexibility and bending strength. The invention comprehends that the filaments making up a given bundle may be similar or different as desired. Where the bundle filaments are utilized it is desirable to treat the bundle with liquid adhesive or bonding means so as to cause penetration into the internal crevices of the bundle and cause firm bonding of the filaments thereof to each other. Such internal bonding of the bundles further provides improved bonding to the embedding rubber of the belt body so as to further improve the useful belt life.

As indicated above, the provision of the transverse filament reinforcing elements below the tensile cords effectively prevents migration of the tensile cords toward the lower surface as a result of thermal contraction of the tensile cords such as due to heating of the belt during the driving operation. As a result the desired arrangement of the tensile cords is maintained to provide further improved trouble-free life of the belt.

Other aspects, objects and advantages of this invention can be obtained from a study of the drawings, the disclosure and the appended claims.

We claim:

1. In a V-belt having a rubber body defining outer and inner faces and a plurality of substantially parallel, low elongation, high strength tensile cords extending lengthwise longitudinally of the V-belt intermediate said faces, the improvement comprising:
   a first plurality of filament reinforcing elements each extending substantially fully transversely across the body outwardly adjacent said tensile cords; and
   a second plurality of filament reinforcing elements each extending substantially fully transversely across the body outwardly adjacent said tensile cords; and
   a second plurality of filament reinforcing elements each extending substantially fully transversely across the body inwardly adjacent said tensile cords for preventing inward migration of the tensile cords, said reinforcing elements defining outer surfaces completely engaging the surrounding rubber body and thereby being connected to each other longitudinally of the belt solely by said rubber body whereby said tensile cords provide the sole control of the longtudinal extension of the belt thereat.

2. The V-belt structure of claim 1 wherein fabric material is adhered to said outer face.

3. The V-belt structure of claim 1 wherein fabric material is adhered to said inner face.

4. The V-belt structure of claim 1 wherein said reinforcing elements comprise monofilaments.

5. The V-belt structure of claim 1 wherein each said reinforcing element comprises a bundle of filaments.

6. The V-belt structure of claim 1 wherein said reinforcing elements are formed of synthetic resin.

7. The V-belt structure of claim 1 wherein said reinforcing elements are comprised of monofilaments and are formed of synthetic resins selected from the group comprising polyester resin, polyamide resin, and polycarbonate resin.

8. The V-belt structure of claim 1 wherein said reinforcing elements comprise a bundle of fibers and are formed of a synthetic resin selected from the group comprising polyamide resin, aliphatic polymamide resin, aromatic polyamide resin, polyvinyl alcohol resin, and polyvinyl acetate resin.

9. The V-belt structure of claim 1 further including a third plurality of filament reinforcing elements each extending substantially fully transversely across the body adjacent said inner face.

10. In a cog V-belt having a rubber body defining outer and inner faces and a plurality of substantially parallel, low elongation, high strength tensile cords extending lengthwise longitudinally of the V-belt intermediate said faces, said inner face being provided with longitudinally spaced, transverse grooves, the improvement comprising:
  a first plurality of filament reinforcing elements each extending substantially fully transversely across the body outwardly adjacent said tensile cords;
  a second plurality of filament reinforcing elements each extending substantially fully transversely across the body adjacent said tensile cords for preventing inward migration of the tensile cords; and
  a third plurality of filament reinforcing elements each extending substantially fully transversely across the body outwardly adjacent said grooves, said reinforcing elements defining outer surfaces completely engaging the surrounding rubber body and thereby being connected to each other longitudinally of the belt solely by said rubber body whereby said tensile cords provide the sole control of the longitudinal extension of the belt thereat.

11. The V-belt structure of claim 10 wherein said third filament reinforcing elements are disposed in at least one planar layer.

12. The V-belt structure of claim 10 wherein said third filament reinforcing elements are arranged in a layer generally corresponding to the configuration of the grooved lower face.

13. The V-belt structure of claim 10 wherein said third filament reinforcing elements are arranged in a layer generally corresponding to the configuration of the grooved lower face with a portion of the second filament reinforcing elements being disposed adjacent said tensile cords.

14. The V-belt structure of claim 10 wherein a portion of said third reinforcing elements are disposed adjacent said tensile cords.

15. In a V-belt having a rubber body defining outer and inner faces and a plurality of substantially parallel, low elongation, high strength tensile cords extending lengthwise longitudinally of the V-belt intermediate said faces, the improvement comprising:
  a first plurality of filament reinforcing elements each extending substantially fully transversely across the body outwardly adjacent said tensile cords;
  a second plurality of filament reinforcing elements, each extending substantially fully transversely across the body inwardly adjacent said tensile cords for preventing inward migration of the tensile cords; and
  a third plurality of filament reinforcing elements randomly disposed in said body spaced from said tensile cords, said reinforcing elements defining outer surfaces completely engaging the surrounding rubber body and thereby being connected to each other longitudinally of the belt solely by said rubber body whereby said tensile cords provide the sole control of the longitudinal extension of the belt thereat.

16. The V-belt structure of claim 15 wherein said third filament reinforcing elements are spaced from said inner face.

17. The V-belt structure of claim 15 wherein said third filament reinforcing elements are distributed throughout said body between said tensile cords and said inner face.

18. The V-belt structure of claim 15 wherein a cover fabric is provided on at least one of said body faces.

19. The V-belt structure of claim 15 wherein said inner face is provided with a plurality of parallel transverse grooves.

* * * * *

UNITED STATES PATENT AND TRADEMARK OFFICE
CERTIFICATE OF CORRECTION

PATENT NO. : 4,555,241

DATED : November 26, 1985

INVENTOR(S) : Hiroshi Takano et al.

It is certified that error appears in the above-identified patent and that said Letters Patent is hereby corrected as shown below:

Column 6, lines 44-47 -
Claim 1, lines 9-12, delete in their entirety.

*Signed and Sealed this*

*Twenty-sixth* Day of *August 1986*

[SEAL]

Attest:

DONALD J. QUIGG

*Attesting Officer*    *Commissioner of Patents and Trademarks*